United States Patent
Lee et al.

(10) Patent No.: US 12,470,251 B2
(45) Date of Patent: *Nov. 11, 2025

(54) MOBILE DEVICES, MOBILE SYSTEMS AND OPERATING METHODS THEREOF

(71) Applicant: Samsung Electronics Co., Ltd., Suwon-si (KR)

(72) Inventors: Sungwoo Lee, Hwaseong-si (KR); Hyoungseok Oh, Seoul (KR); Minkyu Kwon, Hwaseong-si (KR); Sungkyu Cho, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 38 days.

This patent is subject to a terminal disclaimer.

(21) Appl. No.: 18/504,820

(22) Filed: Nov. 8, 2023

(65) Prior Publication Data

US 2024/0072845 A1 Feb. 29, 2024

Related U.S. Application Data

(63) Continuation of application No. 17/739,342, filed on May 9, 2022, now Pat. No. 11,848,690, which is a (Continued)

(30) Foreign Application Priority Data

Dec. 26, 2019 (KR) ........................ 10-2019-0175501

(51) Int. Cl.
*H04B 3/56* (2006.01)
*H04B 3/02* (2006.01)

(52) U.S. Cl.
CPC ................ *H04B 3/56* (2013.01); *H04B 3/02* (2013.01); *H04B 2203/5425* (2013.01); *H04B 2203/5483* (2013.01); *H04B 2203/5491* (2013.01)

(58) Field of Classification Search
CPC .... H04B 3/54; H04B 3/548; H04B 2203/547; H04B 3/56; H04B 2203/5483; H04B 2203/5425
See application file for complete search history.

(56) References Cited

U.S. PATENT DOCUMENTS

| 8,242,742 B2 | 8/2012 | Kao et al. |
| 9,379,923 B2 | 6/2016 | Schwager et al. |

(Continued)

FOREIGN PATENT DOCUMENTS

| CN | 101272134 A | 9/2008 |
| CN | 201251843 Y | 6/2009 |

(Continued)

OTHER PUBLICATIONS

Office action dated Mar. 3, 2021 for corresponding U.S. Appl. No. 17/001,988.

(Continued)

*Primary Examiner* — Aristocratis Fotakis
(74) *Attorney, Agent, or Firm* — Harness, Dickey & Pierce, P.L.C.

(57) ABSTRACT

A first mobile device including a connection terminal configured to electrically connect to a second mobile device, a variable impedance device connected to the connection terminal, the variable impedance device configured to vary an impedance, processing circuitry configured to determine a power line communication (PLC) mode between the first mobile device and the second mobile device to be one of a low-speed PLC mode or a high-speed PLC mode, and control the impedance of the variable impedance device according to the determined PLC mode, and a PLC modem configured to receive power from the second mobile device or communicate data with the second mobile device based on the determined PLC mode.

20 Claims, 12 Drawing Sheets

Related U.S. Application Data continuation of application No. 17/001,988, filed on Aug. 25, 2020, now Pat. No. 11,329,694.

(56) References Cited

U.S. PATENT DOCUMENTS

| | | | |
|---|---|---|---|
| 9,749,014 B2 | 8/2017 | Schwager | |
| 10,218,223 B2 | 2/2019 | Hatanaka et al. | |
| 10,541,726 B1* | 1/2020 | Ding | H04B 3/548 |
| 2006/0152344 A1* | 7/2006 | Mowery | H04B 3/542 |
| | | | 370/331 |
| 2013/0034172 A1 | 2/2013 | Pettler et al. | |
| 2015/0048804 A1 | 2/2015 | Toivanen et al. | |
| 2015/0372718 A1 | 12/2015 | McConnell et al. | |
| 2017/0013342 A1 | 1/2017 | Watson et al. | |
| 2017/0094399 A1* | 3/2017 | Chandramohan | H04R 1/345 |
| 2018/0326854 A1 | 11/2018 | Okada et al. | |
| 2018/0331548 A1* | 11/2018 | Hsu | H02J 7/0036 |
| 2019/0007100 A1* | 1/2019 | Yamashita | H04L 25/4902 |
| 2019/0089411 A1 | 3/2019 | Olmstead et al. | |
| 2020/0122593 A1 | 4/2020 | Noh et al. | |
| 2020/0196372 A1 | 6/2020 | Ouyang et al. | |
| 2020/0213705 A1* | 7/2020 | Ding | H02J 7/0045 |
| 2020/0235949 A1* | 7/2020 | Jones | H04L 12/40045 |

FOREIGN PATENT DOCUMENTS

| | | |
|---|---|---|
| CN | 102934368 A | 2/2013 |
| JP | 2007158539 A | 6/2007 |
| JP | 2009011153 A | 1/2009 |
| JP | 4821076 B2 | 11/2011 |
| JP | 2016096473 A | 5/2016 |
| JP | 2017-175530 A | 9/2017 |
| KR | 100367592 B1 | 1/2003 |
| KR | 10-20120137018 A | 12/2012 |
| KR | 10-20150039210 A | 4/2015 |
| KR | 101802471 B1 | 11/2017 |

OTHER PUBLICATIONS

Office action dated Sep. 29, 2021 for corresponding U.S. Appl. No. 17/001,988.
Notice of Allowance dated Jan. 14, 2022 for corresponding U.S. Appl. No. 17/001,988.
Office Action dated Mar. 29, 2023 for corresponding U.S. Appl. No. 17/739,342.
Notice of Allowance dated Aug. 9, 2023 for corresponding U.S. Appl. No. 17/739,342.
Korean Office Action, dated May 13, 2024, issued in Korean Patent Application No. 10-2019-0175501.
Chinese Notice of Allowance issued Apr. 2, 2025 in Chinese Patent Application No. 202010883931.6.

* cited by examiner

MOBILE DEVICES, MOBILE SYSTEMS AND OPERATING METHODS THEREOF

CROSS-REFERENCE TO RELATED APPLICATION

This application is a continuation of U.S. application Ser. No. 17/739,342, filed on May 9, 2022, which is a continuation of U.S. application Ser. No. 17/001,988, filed on Aug. 25, 2020, which claims priority to Korean Patent Application No. 10-2019-0175501, filed on Dec. 26, 2019, in the Korean Intellectual Property Office, the disclosure of each of which is incorporated herein in its entirety by reference.

BACKGROUND

The inventive concepts relate to a mobile device, and more particularly, to a mobile device and an operating method thereof.

Wireless earphones are devices that receive audio signals via a wireless connection and output sound. Such wireless earphones include a communication module, e.g., a Bluetooth module, for near field communication and a battery to supply driving power to the communication module. As dedicated chargers for charging a battery of wireless earphones, charging cases that house the wireless earphones and charge the battery of the wireless earphones are widely used. Moreover, there is an increasing demand for data exchange between wireless earphones and a charging case.

SUMMARY

According to an aspect of the inventive concepts, there is provided a first mobile device including a connection terminal configured to electrically connect to a second mobile device, a variable impedance device connected to the connection terminal, the variable impedance device configured to vary an impedance, processing circuitry configured to determine a power line communication (PLC) mode between the first mobile device and the second mobile device to be one of a low-speed PLC mode or a high-speed PLC mode, and control the impedance of the variable impedance device according to the determined PLC mode, and a PLC modem configured to receive power from the second mobile device or communicate data with the second mobile device based on the determined PLC mode.

According to an aspect of the inventive concepts, there is provided a second mobile device including a connection terminal configured to electrically connect to a first mobile device, a variable impedance device connected to the connection terminal, the variable impedance device configured to vary an impedance, processing circuitry configured to determine a power line communication (PLC) mode to be one of a low-speed PLC mode or a high-speed PLC mode, control the impedance of the variable impedance device according to the determined PLC mode, receive an input voltage from an external source, and generate a converted voltage from the input voltage, and a PLC modem configured to transmit power to the first mobile device or communicate data with the first mobile device based on the determined PLC mode, the power being based on the converted voltage.

According to an aspect of the inventive concepts, there is provided a mobile system including a first mobile device and a second mobile device, the first mobile device and the second mobile device being configured to transfer power and data with each other using power line communication (PLC), wherein the first mobile device includes a first connection terminal configured to electrically connect to the second mobile device, a first variable impedance device connected to the first connection terminal, and first processing circuitry configured to determine a first PLC mode between the first mobile device and the second mobile device to be one of a low-speed PLC mode or a high-speed PLC mode, and control an impedance of the first variable impedance device according to the determined first PLC mode, and the second mobile device includes a second connection terminal configured to electrically connect to the first mobile device, a second variable impedance device connected to the second connection terminal, and second processing circuitry configured to determine a second PLC mode between the first mobile device and the second mobile device to be the one of the low-speed PLC mode or the high-speed PLC mode, and control an impedance of the second variable impedance device according to the determined second PLC mode.

According to an aspect of the inventive concepts, there is provided an operating method of a first mobile device. The operating method includes receiving a host request from a second mobile device through a connection terminal in a low-speed power line communication (PLC) mode, changing a PLC mode between the first mobile device and the second mobile device from the low-speed PLC mode to a high-speed PLC mode including increasing an impedance of a signal line in response to the host request, the signal line being connected to the connection terminal, receiving data from the second mobile device in the high-speed PLC mode, and changing the PLC mode from the high-speed PLC mode to the low-speed PLC mode including decreasing the impedance of the signal line based on completion of the receiving the data.

According to an aspect of the inventive concepts, there is provided an operating method of a second mobile device. The operating method includes transmitting a host request to a first mobile device through a connection terminal in a low-speed power line communication (PLC) mode, receiving a client response from the first mobile device as a response to the host request, changing a PLC mode between the first mobile device and the second mobile device from the low-speed PLC mode to a high-speed PLC mode including increasing an impedance of a signal line based on the client response, the signal line being connected to the connection terminal, transmitting data to the first mobile device in the high-speed PLC mode, and changing the PLC mode from the high-speed PLC mode to the low-speed PLC mode including decreasing the impedance of the signal line based on completion of the transmitting the data.

BRIEF DESCRIPTION OF THE DRAWINGS

Some example embodiments of the inventive concepts will be more clearly understood from the following detailed description taken in conjunction with the accompanying drawings in which.

DETAILED DESCRIPTION

Hereinafter, some example embodiments will be described in detail with reference to the accompanying drawings.

Figure 1:
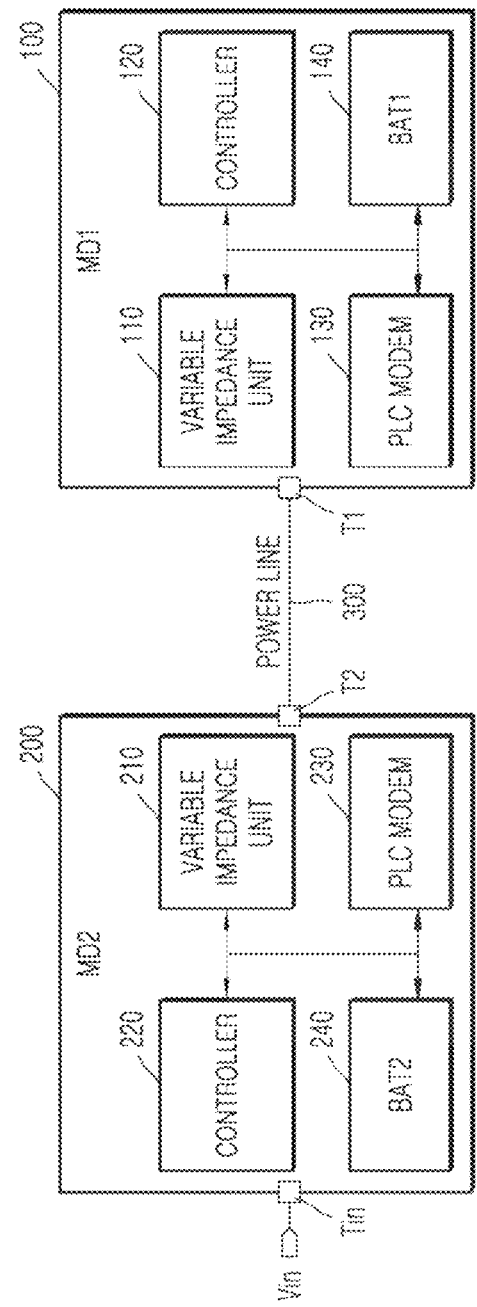
FIG. 1 illustrates a mobile system according to some example embodiments.

FIG. 1 illustrates a mobile system 10 according to some example embodiments.

Referring to FIG. 1, the mobile system 10 may include a first mobile device (MD1) 100 and a second mobile device (MD2) 200. The first mobile device 100 may exchange power and data with the second mobile device 200 through power line communication (PLC). The first mobile device 100 may include a first connection terminal T1, which is configured to be electrically connected to the second mobile device 200, and may receive power from the second mobile device 200 or exchange data with the second mobile device 200 through the first connection terminal T1. Similarly, the second mobile device 200 may include a second connection terminal T2, which is configured to be electrically connected to the first mobile device 100, and may supply power to the first mobile device 100 or exchange data with the first mobile device 100 through the second connection terminal T2.

PLC is communication technology for transferring power and data through a power line 300. For example, the power line 300 may be realized via electrical contact between the first connection terminal T1 and the second connection terminal T2 so that the first and second mobile devices 100 and 200 may exchange power and data with each other. In conventional mobile devices, a pin separate from the electrical contact is included for use in data exchange. As a result, the size of the conventional mobile devices is increased to accommodate this separate pin.

However, according to some example embodiments, the first mobile device 100 does not include a separate connection terminal or pin for data exchange with the second mobile device 200 and may exchange data with the second mobile device 200 through the first connection terminal T1 that receives power. Similarly, the second mobile device 200 does not include a separate connection terminal or pin for data exchange with the first mobile device 100 and may exchange data with the first mobile device 100 through the second connection terminal T2 that transmits power. Accordingly, some example embodiments improve over the deficiencies of the conventional mobile devices enable reduction of the size of each of the first mobile device 100 and the second mobile device 200 by omission of the separate pin. Such a reduction in size is particularly advantageous in mobile devices for which a small size is often desirable.

The first mobile device 100 may further include a variable impedance unit 110 (also referred to herein as a variable impedance device), a controller 120, a PLC modem 130, and/or a first battery (BAT1) 140. The variable impedance unit 110 may be electrically connected to the first connection terminal T1, may include an impedance element such as a resistor or a capacitor, and may have variable impedance under the control of the controller 120. For example, the variable impedance unit 110 may include at least one variable resistor. In another example, the variable impedance unit 110 may include at least one resistor and at least one switch.

The controller 120 may determine a PLC mode between the first mobile device 100 and the second mobile device 200 to be one of a plurality of PLC modes including a low-speed PLC mode and a high-speed PLC mode. For example, the low-speed PLC mode may correspond to a power communication mode that transmits power through PLC. For example, the high-speed PLC mode may correspond to a data communication mode that transmits and receives data through PLC. According to some example embodiments, the PLC modes may further include at least one selected from a PLC mode having a communication speed between the communication speed of the low-speed PLC mode and the communication speed of the high-speed PLC mode, a PLC mode having a lower communication speed than the low-speed PLC mode, and/or a PLC mode having a higher communication speed than the high-speed PLC mode The controller 120 may control the impedance of the variable impedance unit 110 according to the determined PLC mode. For example, the controller 120 may control the variable impedance unit 110 to have a first impedance in the low-speed PLC mode and to have a second impedance, which is higher than the first impedance, in the high-speed PLC mode. The controller 120 may also control the PLC modem 130 according to the determined PLC mode. Furthermore, the controller 120 may control the first battery 140 to be charged based on the power received from the second mobile device 200. For example, the controller 120 may include a micro control unit (MCU). However, some example embodiments are not limited thereto, and the controller 120 may include a processor or a central processing unit (CPU).

The PLC modem 130 may receive power from the second mobile device 200 and/or exchange data with the second mobile device 200, based on the determined PLC mode. In detail, the PLC modem 130 may modulate a signal (e.g., voltage and/or current) to be output through the first connection terminal T1 and/or demodulate a signal received from the first connection terminal T1. For example, the PLC modem 130 may include a current source, a current modulator, and/or a voltage demodulator. This will be described with reference to FIG. 5 below.

The second mobile device 200 may further include a variable impedance unit 210, a controller 220, a PLC modem 230, and/or a second battery (BAT2) 240. In some example embodiments, the second mobile device 200 may further include an input voltage terminal Tin, which may receive an input voltage Vin from the outside of the second mobile device 200. For example, the input voltage terminal Tin may receive the input voltage Vin from a household power supply, e.g., alternating current (AC) about 110 Volts to 220 Volts, or another power supply unit (e.g., a computer or an auxiliary battery). In some example embodiments, the second mobile device 200 may wirelessly receive the input voltage Vin from the outside thereof.

The variable impedance unit 210 may be electrically connected to the second connection terminal T2, may include an impedance element such as a resistor or a capacitor, and may have variable impedance under the control of the controller 220. The variable impedance unit 210 may be the same as or substantially similar to the variable impedance unit 110, and the above descriptions of the variable impedance unit 110 may also be applied to the variable impedance unit 210.

The controller 220 may determine a PLC mode between the first mobile device 100 and the second mobile device 200 to be one of a plurality of PLC modes including a low-speed PLC mode and a high-speed PLC mode. The controller 220 may control the impedance of the variable impedance unit 210 according to the determined PLC mode. For example, the controller 220 may control the variable impedance unit 210 to have first impedance in the low-speed PLC mode and to have second impedance, which is higher than the first impedance, in the high-speed PLC mode. The controller 220 may also control the PLC modem 230 according to the determined PLC mode. Furthermore, the controller 220 may control the second battery 240 to be charged based on the input voltage Vin. The controller 220 may be the same as or substantially similar to the controller 120, and the above descriptions of the controller 120 may also be applied to the controller 220.

The PLC modem 230 may supply power to the first mobile device 100 and/or exchange data with the first mobile device 100, based on the determined PLC mode. In detail, the PLC modem 230 may modulate a signal (e.g., voltage and/or current) to be output through the second connection terminal T2 and/or demodulate a signal received from the second connection terminal T2. For example, the PLC modem 230 may include a low-speed PLC modem operating in the low-speed PLC mode and a high-speed PLC modem operating in the high-speed PLC mode. This will be described with reference to FIG. 3 below.

In some example embodiments, the first mobile device 100 may include a wireless earbud or a wireless earphone, and the second mobile device 200 may include a wireless earbud charger or a wireless earphone charger. Through PLC via the electrical contact between the first connection terminal T1 and the second connection terminal T2, the second mobile device 200 may charge the first mobile device 100, and the first mobile device 100 and the second mobile device 200 may exchange data with each other. According to some example embodiments, the first mobile device 100 and the second mobile device 200 may exchange data through the first and second connection terminals T1 and T2 that transmit power, without including separate terminals for data exchange.

In general, a mobile device includes a battery and a power management integrated circuit (PMIC) managing the battery. To implement PLC, the PMIC in conventional mobile devices may change a voltage level of a power line through current and/or voltage control. At this time, because of current and/or voltage control speed limitations of the PMIC, it takes a significant amount of time for conventional mobile devices to exchange a large amount of data.

However, according to some example embodiments, the first and second mobile devices 100 and 200 may determine the PLC mode to be the high-speed PLC mode for data exchange, and may increase the impedance of the variable impedance units 110 and 210 connected to the power line 300 in the high-speed PLC mode. As described above, according to some example embodiments, the first and second mobile devices 100 and 200 may efficiently support the low-speed PLC mode and the high-speed PLC mode by changing the impedance of the variable impedance units 110 and 210 according to a communication speed through the power line 300. Accordingly, the first and second mobile devices 100 and 200 may improve over the deficiencies of the conventional mobile devices to exchange more data in less time (e.g., at a higher data rate) than the conventional mobile devices.

Figure 2:
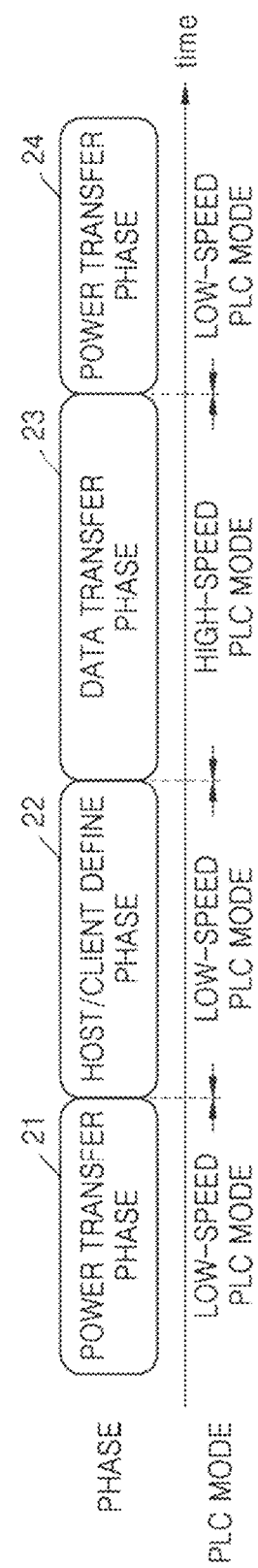
FIG. 2 illustrates a power line communication (PLC) mode between a first mobile device and a second mobile device over time, according to some example embodiments.

FIG. 2 illustrates a PLC mode between the first mobile device 100 and the second mobile device 200 over time, according to some example embodiments.

Referring to FIG. 2, in a power communication phase or a power transfer phase 21, the second mobile device 200 may transmit power to the first mobile device 100. At this time, the PLC mode between the first and second mobile devices 100 and 200 may be determined to be the low-speed PLC mode. In a host/client define phase 22, a host transmitting data and a client receiving the data may be determined between the first and second mobile devices 100 and 200. At this time, the PLC mode between the first and second mobile devices 100 and 200 may be still determined to be the low-speed PLC mode. For example, the second mobile device 200 may be determined to be the host and the first mobile device 100 may be determined to be the client.

In a data communication phase or a data transfer phase 23, the host may transmit data to the client. At this time, the PLC mode between the first and second mobile devices 100 and 200 may be determined to be the high-speed PLC mode. For example, the second mobile device 200 may transmit data to the first mobile device 100. In the data transfer phase 23, the main function of the power line 300 may be changed from power transfer to data transfer. In some example embodiments, only data may be transmitted through the power line 300 in the data transfer phase 23. However, some example embodiments are not limited thereto. Power and data may be transmitted through the power line 300 in the data transfer phase 23.

When data transfer is completed, a power transfer phase 24 begins anew, and the PLC mode between the first and second mobile devices 100 and 200 may be determined to be the low-speed PLC mode. The main function of the power line 300 may be changed from data transfer to power transfer in the power transfer phase 24. In some example embodiments, only power may be transmitted through the power line 300 in the power transfer phase 24. However, some example embodiments are not limited thereto. Data and power may be transmitted through the power line 300 in the power transfer phase 24.

Figure 3:
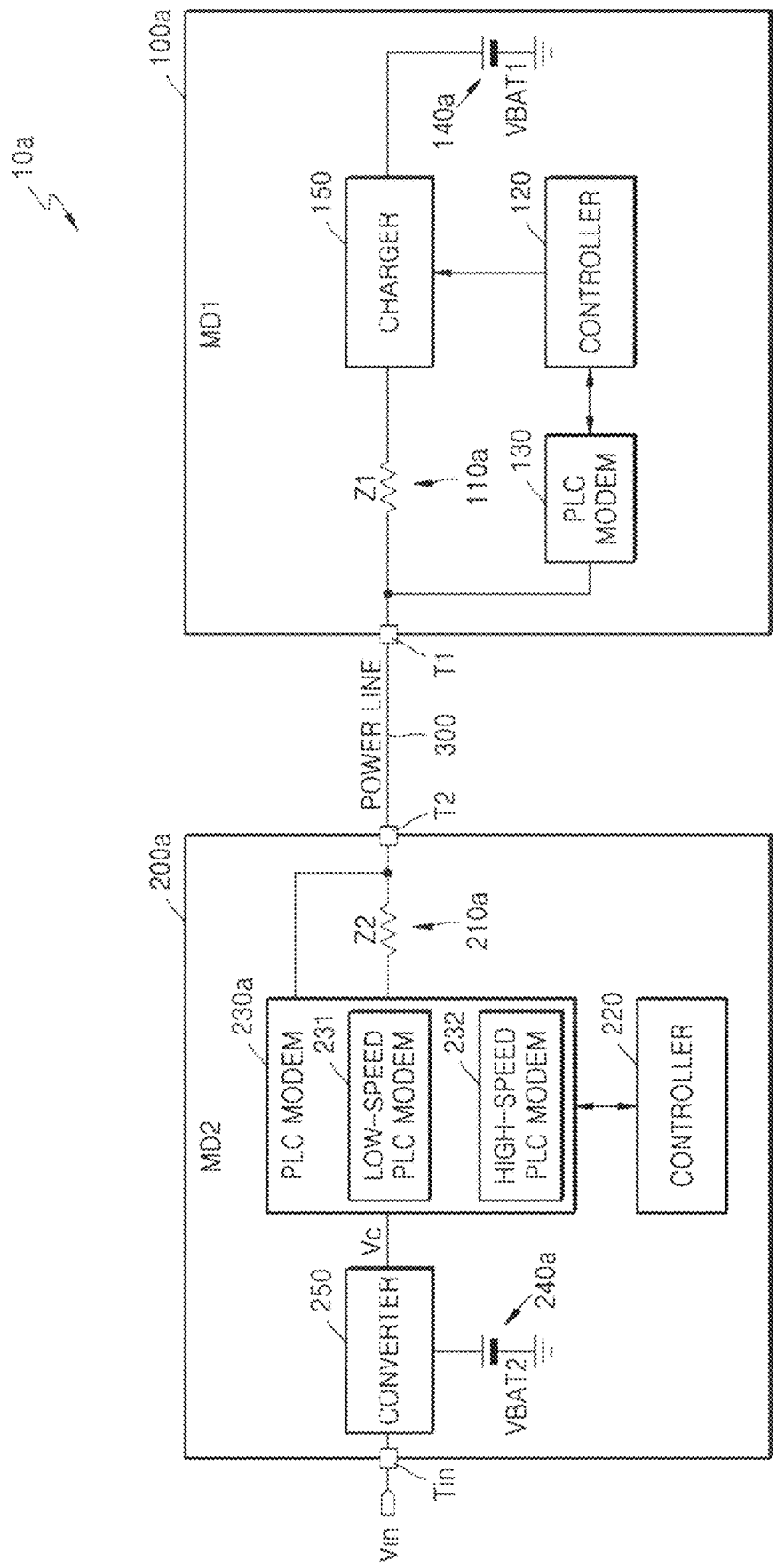
FIG. 3 illustrates a mobile system according to some example embodiments.

FIG. 3 illustrates a mobile system 10a according to some example embodiments.

Referring to FIG. 3, the mobile system 10a may include a first mobile device 100a and a second mobile device 200a. The first and second mobile devices 100a and 200a may correspond to examples of the first and second mobile devices 100 and 200 in FIG. 1. The descriptions given above with reference to FIGS. 1 and 2 may also be applied to FIG. 3.

The first mobile device 100a may include the first connection terminal T1, a variable impedance unit 110a, the controller 120, the PLC modem 130, a first battery 140a, and/or a charge circuit or a charger 150. For example, the variable impedance unit 110a, the controller 120, the PLC modem 130, the first battery 140a, and/or the charger 150 may be mounted on a printed circuit board (PCB). The controller 120 may control an impedance Z1 of the variable impedance unit 110a according to the PLC mode. In detail, the controller 120 may determine the impedance Z1 to be the first impedance in the low-speed PLC mode and to be the second impedance, which is higher than the first impedance, in the high-speed PLC mode. The controller 120 may also control the PLC modem 130 according to the PLC mode.

The charger 150 may be a linear charger and may be implemented as a charging IC. The controller 120 may control the operation of the charger 150 based on the PLC mode. For example, in the power transfer phase 21 (in FIG. 2), the PLC mode may be the low-speed PLC mode, and the controller 120 may activate the charger 150 and thus charge the first battery 140a with a battery voltage VBAT1 using power received through the power line 300. For example, in the data transfer phase 23 (in FIG. 2), the PLC mode may be the high-speed PLC mode, and the controller 120 may deactivate the charger 150 and the first mobile device 100a may operate using the battery voltage VBAT1 of the first battery 140a.

The second mobile device 200a may include the second connection terminal T2, a variable impedance unit 210a, the controller 220, a PLC modem 230a, a second battery 240a, and/or a converter 250. For example, the variable impedance unit 210a, the controller 220, the PLC modem 230a, the second battery 240a, and/or the converter 250 may be mounted on a PCB. The controller 220 may control an impedance Z2 of the variable impedance unit 210a according to the PLC mode. In detail, the controller 220 may determine the impedance Z2 to be the first impedance in the low-speed PLC mode and to be the second impedance, which is higher than the first impedance, in the high-speed PLC mode. The PLC modem 230a may include a low-speed PLC modem 231 and/or a high-speed PLC modem 232, which may selectively operate. The controller 220 may activate the low-speed PLC modem 231 in the low-speed PLC mode and activate the high-speed PLC modem 232 in the high-speed PLC mode.

In some example embodiments, the converter 250 may include a switching regulator, which generates a converted voltage Vc from the input voltage Vin and/or a battery voltage VBAT2 of the second battery 240a, wherein the input voltage Vin is received from the outside of the second mobile device 200a through the input voltage terminal Tin. The converter 250 may be a direct current (DC)-DC converter. For example, the converter 250 may be a step-up converter (e.g., a boost converter) that converts the input voltage Vin and/or the battery voltage VBAT2, which is relatively low, into the converted voltage Vc, which is relatively high, and/or a step-down converter (e.g., a buck converter) that converts the input voltage Vin and/or the battery voltage VBAT2, which is relatively high, into the converted voltage Vc, which is relatively low. The converter 250 may also charge the second battery 240a with the battery voltage VBAT2 based on the input voltage Vin, which is received from the outside of the second mobile device 200a.

In some example embodiments, each of the first and second batteries 140a and 240a may include at least one battery cell. For example, the first battery 140a and/or the second battery 240a may be a multi-cell battery including a plurality of battery cells connected in series to each other. In some example embodiments, each of the first and second batteries 140a and 240a may include at least one battery pack. For example, the first battery 140a and/or the second battery 240a may be implemented by a battery device including a plurality of battery packs connected in series to each other.

Figure 4:
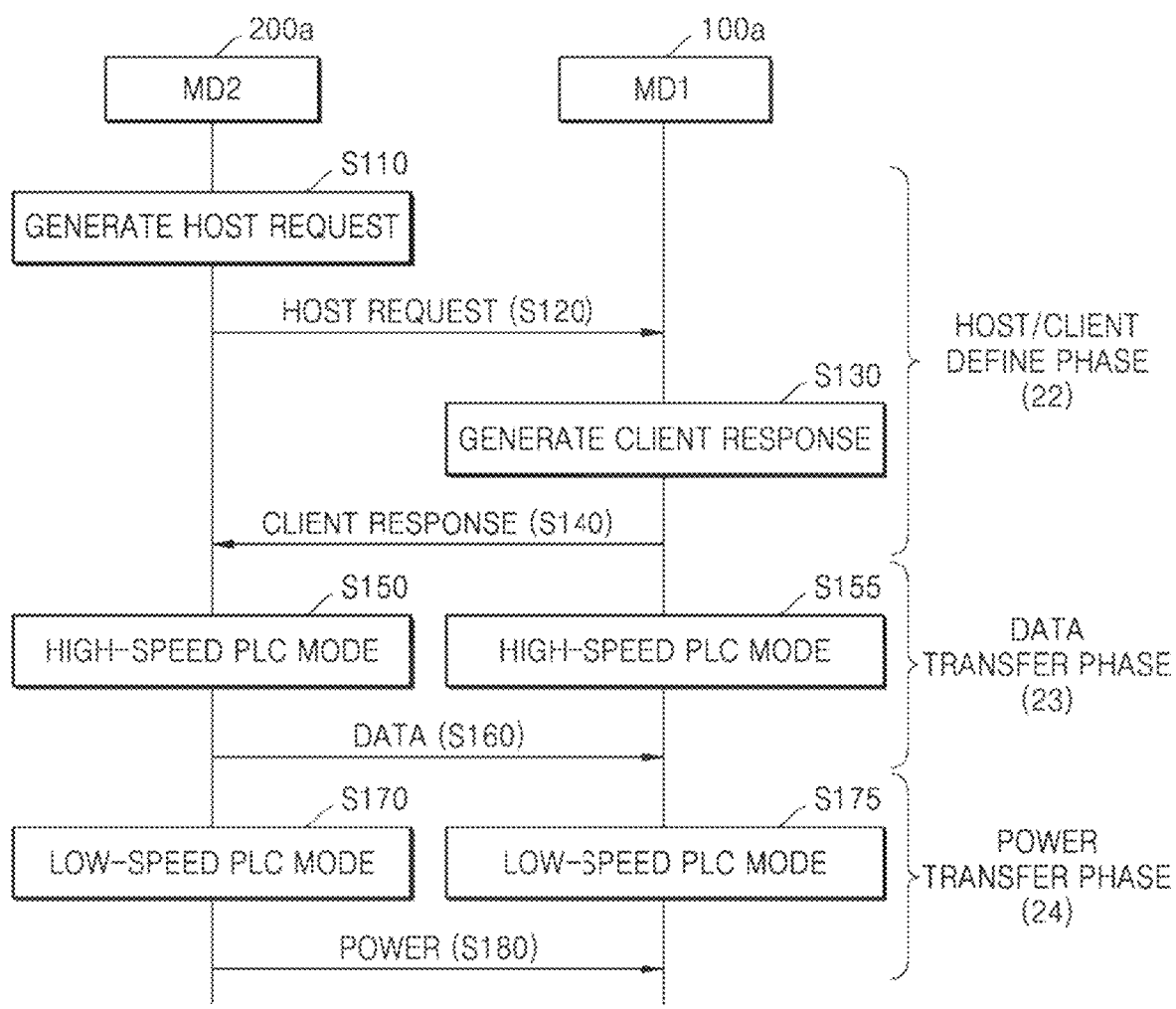
FIG. 4 is a flowchart of the operations between a first mobile device and a second mobile device, according to some example embodiments.

FIG. 4 is a flowchart of the operations between the first mobile device 100a and the second mobile device 200a, according to some example embodiments.

Referring to FIG. 4, the second mobile device 200a may generate a host request (e.g., REQ in FIG. 6) in operation S110. The second mobile device 200a may transmit the host request to the first mobile device 100a in operation S120. The first mobile device 100a may generate a client response (e.g., RES in FIG. 6) in response to the host request in operation S130. The first mobile device 100a may transmit the client response to the second mobile device 200a in operation S140. For example, operations S110 through S140 may correspond to the host/client define phase 22 in FIG. 2, and both of the first and second mobile devices 100a and 200a may operate in the low-speed PLC mode. At this time, the impedances Z1 and Z2 of the variable impedance units 110a and 210a respectively included in the first and second mobile devices 100a and 200a may be relatively low.

The second mobile device 200a may determine the PLC mode to be the high-speed PLC mode in operation S150 (e.g., based on the client response). Accordingly, the impedance Z2 of the variable impedance unit 210a of the second mobile device 200a may increase, the high-speed PLC modem 232 may be activated, and the low-speed PLC modem 231 may be deactivated. The first mobile device 100a may determine the PLC mode to be the high-speed PLC mode in operation S155 (e.g., based on sending the client response in operation S140). Accordingly, the impedance Z1 of the variable impedance unit 110a of the first mobile device 100a may increase. Operations S150 and S155 may be performed substantially simultaneously or contemporaneously.

The second mobile device 200a may transmit data to the first mobile device 100a in operation S160. For example, the data may correspond to firmware, and the second mobile device 200a may transmit the firmware, which is downloaded from a host, to the first mobile device 100a. When a failure occurs in an Integrated Circuit (IC) (e.g., an IC of the first mobile device 100a) after the first mobile device 100a is launched, the first mobile device 100a may repair the failure in the IC using the firmware received from the second mobile device 200a. For example, operations S150 through S160 may correspond to the data transfer phase 23 in FIG. 2. According to some example embodiments, operations S110 through S140 may correspond to a detection of a failure of an IC of the first mobile device 100a, detection of a firmware update that should be provided to the first mobile device 100a, and/or a request to transfer the firmware configured to repair the failure and/or facilitate the firmware update. According to some example embodiments, the first mobile device 100a may store, install and/or execute the received firmware following operation S160. According to some example embodiments, the first mobile device 100a may repair the failure of the IC using the received firmware following operation S160.

The second mobile device 200a may determine the PLC mode to be the low-speed PLC mode in operation S170 (e.g., based on completion of the transmission of the data in operation S160). Accordingly, the impedance Z2 of the variable impedance unit 210a of the second mobile device 200a may decrease, the low-speed PLC modem 231 may be activated, and the high-speed PLC modem 232 may be deactivated. The first mobile device 100a may determine the PLC mode to be the low-speed PLC mode in operation S175

(e.g., based on completion of the transmission of the data in operation S160). Accordingly, the impedance Z1 of the variable impedance unit 110a of the first mobile device 100a may decrease. Operations S170 and S175 may be performed substantially simultaneously or contemporaneously. The second mobile device 200a may transmit power to the first mobile device 100a in operation S180. For example, operations S170 through S180 may correspond to the power transfer phase 24 in FIG. 2.

Figure 5:
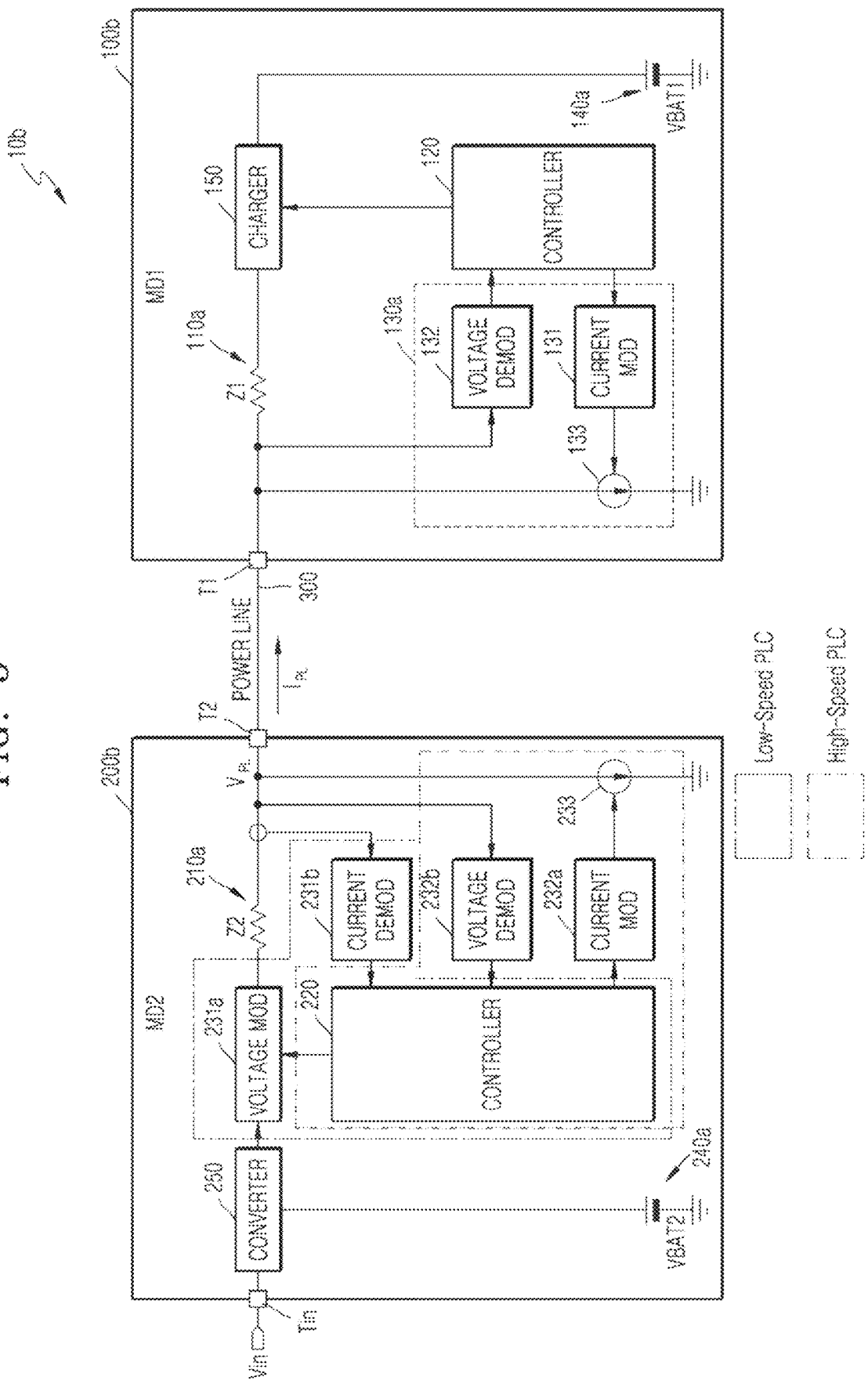
FIG. 5 illustrates a mobile system according to some example embodiments.

FIG. 5 illustrates a mobile system 10b according to some example embodiments.

Referring to FIG. 5, the mobile system 10b may include a first mobile device 100b and a second mobile device 200b. The first and second mobile devices 100b and 200b may correspond to examples of the first and second mobile devices 100a and 200a in FIG. 3. Therefore, the descriptions given above with reference to FIGS. 3 and 4 may also be applied to FIG. 5. When the first mobile device 100b is connected to the second mobile device 200b by the electrical contact between the first and second connection terminals T1 and T2, a line current $I_{PL}$ may flow through the power line 300, and the respective voltages of the first and second connection terminals T1 and T2 may be the same as or similar to each other at a line voltage $V_{PL}$.

The first mobile device 100b may include the first connection terminal T1, the variable impedance unit 110a, the controller 120, a PLC modem 130a, the first battery 140a, and/or the charger 150. The controller 120 may generate a control signal for controlling the PLC modem 130a according to the PLC mode. The PLC modem 130a may include a current modulator (MOD) 131, a voltage demodulator (DEMOD) 132, and/or a current source 133. The current MOD 131 may receive the control signal from the controller 120 and generate a current modulation signal according to the control signal. The current source 133 may generate a current pulse according to the current modulation signal and provide the current pulse to the first connection terminal T1. The voltage DEMOD 132 may generate voltage demodulation signal according to the line voltage $V_{PL}$ of the first connection terminal T1 and provide the voltage demodulation signal to the controller 120.

The second mobile device 200b may include the second connection terminal T2, the variable impedance unit 210a, the controller 220, a voltage MOD 231a, a current DEMOD 231b, a current MOD 232a, a voltage DEMOD 232b, a current source 233, the second battery 240a, and/or the converter 250. According to the PLC mode, the controller 220 may generate control signals for controlling the voltage MOD 231a, the current DEMOD 231b, the current MOD 232a, the voltage DEMOD 232b, and/or the current source 233. At this time, the voltage MOD 231a and the current DEMOD 231b may be activated in the low-speed PLC mode and may form the low-speed PLC modem 231 in FIG. 3. The current MOD 232a, the voltage DEMOD 232b, and the current source 233 may be activated in the high-speed PLC mode and may form the high-speed PLC modem 232 in FIG. 3.

In the low-speed PLC mode, the controller 220 may activate the voltage MOD 231a and the current DEMOD 231b, and deactivate the current MOD 232a, the voltage DEMOD 232b, and the current source 233. In the low-speed PLC mode, the voltage MOD 231a may receive a control signal from the controller 220 and generate a voltage modulation signal according to the control signal. The voltage MOD 231a may transmit the voltage modulation signal to the first mobile device 100b through the variable impedance unit 210a and the second connection terminal T2. The voltage MOD 231a may include a linear regulator, e.g., a low drop-out (LDO) regulator. The current DEMOD 231b may generate a current demodulation signal according to the line current $I_{PL}$ received through the second connection terminal T2 and provide the current demodulation signal to the controller 220.

In the high-speed PLC mode, the controller 220 may deactivate the voltage MOD 231a and the current DEMOD 231b and activate the current MOD 232a, the voltage DEMOD 232b, and the current source 233. In the high-speed PLC mode, the current MOD 232a may receive a control signal from the controller 220 and generate a current modulation signal according to the control signal. The current source 233 may generate a current pulse according to the current modulation signal and provide the current pulse to the second connection terminal T2. The voltage DEMOD 232b may generate a voltage demodulation signal according to the line voltage $V_{PL}$ of the second connection terminal T2 and provide the voltage demodulation signal to the controller 220.

Figure 6:
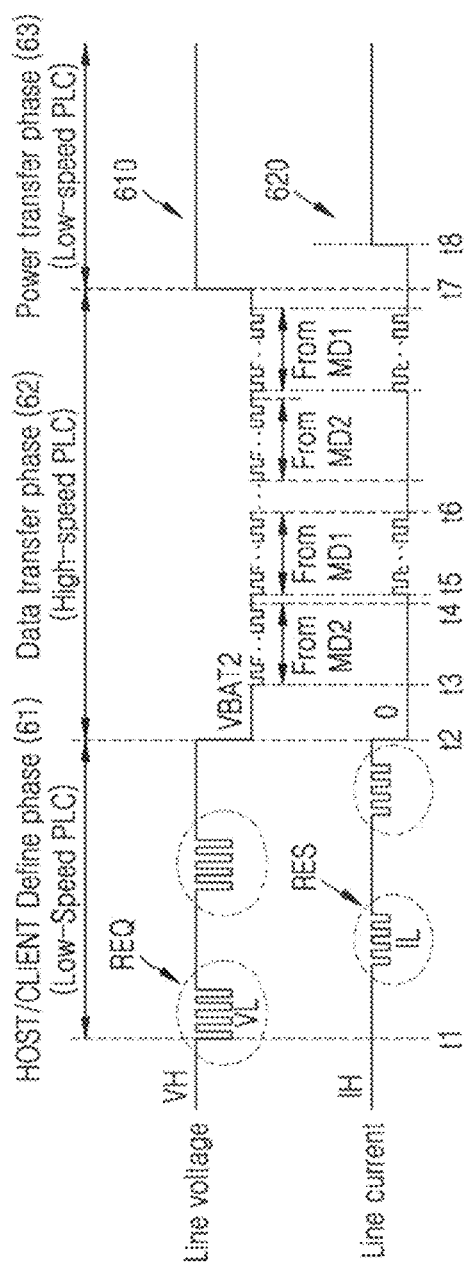
FIG. 6 is a timing diagram of an example of PLC data exchange between a first mobile device and a second mobile device, according to some example embodiments.

FIG. 6 is a timing diagram of an example of PLC data exchange between the first mobile device MD1 and the second mobile device MD2, according to some example embodiments.

Referring to FIG. 6, a first graph 610 represents a line voltage over time and may correspond to, for example, the line voltage $V_{PL}$ of the first or second connection terminal T1 or T2 connected to the power line 300 in FIG. 5. A second graph 620 represents a line current over time and may correspond to, for example, the line current $I_{PL}$ flowing in the power line 300 in FIG. 5. For example, the first and second mobile devices MD1 and MD2 may respectively correspond to the first and second mobile devices 100b and 200b in FIG. 5. Hereinafter, descriptions will be made with reference to FIGS. 5 and 6.

A time period from a time point t1 to a time point t2 may correspond to a host/client define phase 61. At this time, the first and second mobile devices 100b and 200b may operate in the low-speed PLC mode. The impedances Z1 and Z2 of the variable impedance units 110a and 210a respectively included in the first and second mobile devices 100b and 200b may be relatively low. In some example embodiments, the impedance Z1 of the variable impedance unit 110a may be equal or similar to the impedance Z2 of the variable impedance unit 210a in the host/client define phase 61. However, some example embodiments are not limited thereto. In some example embodiments, the impedance Z1 of the variable impedance unit 110a may be different from the impedance Z2 of the variable impedance unit 210a in the host/client define phase 61.

In the host/client define phase 61, the second mobile device 200b may transmit a host request REQ to the first mobile device 100b, and the first mobile device 100b may transmit a client response RES to the second mobile device 200b in response to the host request REQ. According to some example embodiments, the host request REQ and the client response RES may be exchanged at least two times in the host/client define phase 61.

In the host/client define phase 61, the converter 250 and the voltage MOD 231a of the second mobile device 200b may be activated, and the voltage MOD 231a may generate a voltage modulation signal from the converted voltage Vc, which is received from the converter 250, according to a control signal received from the controller 220. However, some example embodiments are not limited thereto. The converter 250 may bypass the input voltage Vin, and the voltage MOD 231a may generate the voltage modulation signal from the input voltage Vin according to the control signal received from the controller 220. For example, the voltage MOD 231a may generate a voltage modulation signal, e.g., a plurality of voltage pulses, as the host request REQ, wherein the voltage modulation signal toggles between a high voltage VH and a low voltage VL. The host request REQ may be provided to the first connection terminal T1 of the first mobile device 100b through the power line 300.

The voltage DEMOD 132 of the first mobile device 100b may generate a voltage demodulation signal from the host request REQ and provide the voltage demodulation signal to the controller 120. The controller 120 may generate a control signal in response to the host request REQ and provide the control signal to the current MOD 131. The current MOD 131 may generate a current modulation signal according to the control signal and provide the current modulation signal to the current source 133. The current source 133 may generate, as the client response RES, a plurality of current pulses toggling between a high current IH and a low current IL according to the current modulation signal. The client response RES may be provided to the second connection terminal T2 of the second mobile device 200b through the power line 300.

After receiving the client response RES, the controller 220 of the second mobile device 200b may change the PLC mode from the low-speed PLC mode to the high-speed PLC mode and thus set the impedance Z2 of the variable impedance unit 210a to be relatively high. Similarly, after transmitting the client response RES, the controller 120 of the first mobile device 100b may change the PLC mode from the low-speed PLC mode to the high-speed PLC mode and thus set the impedance Z1 of the variable impedance unit 110a to be relatively high.

A time period from the time point t2 to a time point t7 may correspond to a data transfer phase 62. At this time, the first and second mobile devices 100b and 200b may operate in the high-speed PLC mode. The impedances Z1 and Z2 of the variable impedance units 110a and 210a respectively included in the first and second mobile devices 100b and 200b may be relatively high. In some example embodiments, the impedance Z1 of the variable impedance unit 110a may be equal or similar to the impedance Z2 of the variable impedance unit 210a in the data transfer phase 62. However, some example embodiments are not limited thereto. In some example embodiments, the impedance Z1 of the variable impedance unit 110a may be different from the impedance Z2 of the variable impedance unit 210a in the data transfer phase 62.

In the data transfer phase 62, the converter 250 of the second mobile device 200b may be deactivated, and the second mobile device 200b may operate using the battery voltage VBAT2 of the second battery 240a. For example, the converter 250 may operate in a bypass mode that bypasses the battery voltage VBAT2 of the second battery 240a. In the data transfer phase 62, the charger 150 of the first mobile device 100b may be deactivated, and the first mobile device 100b may operate using the battery voltage VBAT1 of the first battery 140a. As described above, because the charger 150 of the first mobile device 100b is deactivated, an operation of charging the first battery 140a by transmitting power from the second mobile device 200b to the first mobile device 100b may be interrupted or substantially interrupted, and only data may be transmitted through PLC. However, some example embodiments are not limited thereto. In some example embodiments, in the data transfer phase 62, the charger 150 of the first mobile device 100b may be activated, and both power and data may be transmitted through PLC.

In a time period from a time point t3 to a time point t4, the current source 233 of the second mobile device 200b may be activated and the current source 133 of the first mobile device 100b may be deactivated. In detail, the current MOD 232a of the second mobile device 200b may generate a current modulation signal, and the current source 233 may generate a current pulse according to the current modulation signal and provide the current pulse to the power line 300 through the second connection terminal T2. At this time, the voltage DEMOD 132 of the first mobile device 100b may generate a voltage demodulation signal from the line voltage $V_{PL}$ of the first connection terminal T1 connected to the power line 300.

In a time period from a time point t5 to a time point t6, the current source 133 of the first mobile device 100b may be activated and the current source 233 of the second mobile device 200b may be deactivated. In detail, the current MOD 131 of the first mobile device 100b may generate a current modulation signal, and the current source 133 may generate a current pulse according to the current modulation signal and provide the current pulse to the power line 300 through the first connection terminal T1. At this time, the voltage DEMOD 232b of the second mobile device 200b may generate a voltage demodulation signal from the line voltage $V_{PL}$ of the second connection terminal T2 connected to the power line 300.

A time period following the time point t7 may correspond to a power transfer phase 63. At this time, the first mobile device 100b and the second mobile device 200b may operate in the low-speed PLC mode. In the power transfer phase 63, the converter 250 and the current MOD 231a of the second mobile device 200b may be activated, and the line voltage $V_{PL}$ may maintain the high voltage VH. At a time point t8, the charger 150 of the first mobile device 100b may be activated, and the line current $I_{PL}$ may maintain the high current IH. Accordingly, the second mobile device 200b may transmit power to the first mobile device 100b through PLC, and the charger 150 of the first mobile device 100b may charge the first battery 140a.

Figure 7:
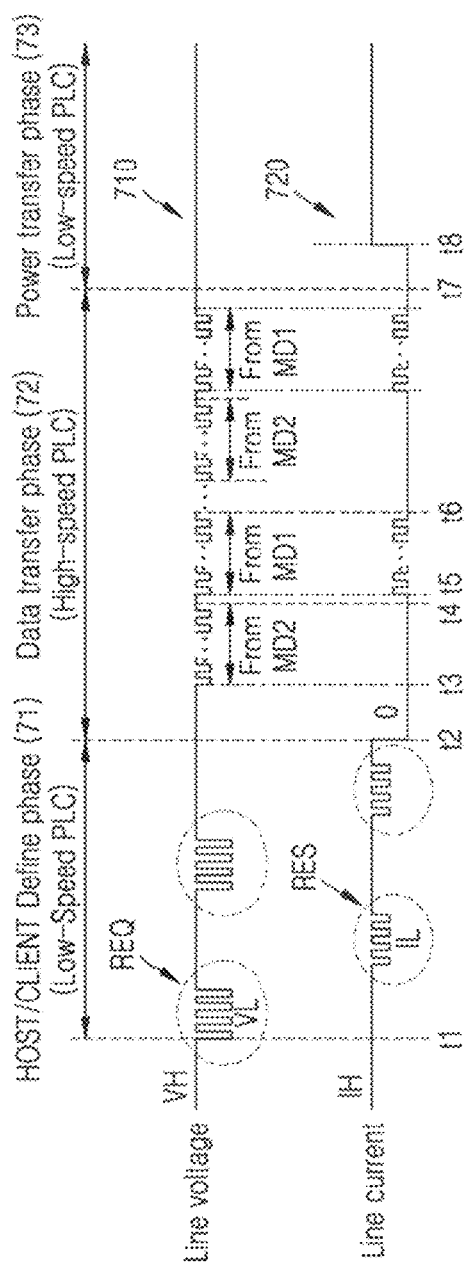
FIG. 7 is a timing diagram of another example of PLC data exchange between a first mobile device and a second mobile device, according to some example embodiments.

FIG. 7 is a timing diagram of another example of PLC data exchange between the first mobile device MD1 and the second mobile device MD2, according to some example embodiments.

Referring to FIG. 7, a first graph 710 represents a line voltage over time and may correspond to, for example, the line voltage $V_{PL}$ of the first or second connection terminal T1 or T2 connected to the power line 300 in FIG. 5. A second graph 720 represents a line current over time and may correspond to, for example, the line current $I_{PL}$ flowing in the power line 300 in FIG. 5. For example, the first and second mobile devices MD1 and MD2 may respectively correspond to the first and second mobile devices 100b and 200b in FIG. 5. Hereinafter, descriptions will be made with reference to FIGS. 5 and 7.

PLC data exchange according to some example embodiments corresponds to a modification of the PLC data exchange of FIG. 6 and is different from the PLC data exchange of FIG. 6 in a data transfer phase 72. Hereinafter, descriptions will be focused on the data transfer phase 72, and the descriptions given with reference to FIG. 6 may also be applied. The time period from the time point t1 to the time point t2 may correspond to a host/client define phase 71. The operations of the first and second mobile devices 100b and 200b in the host/client define phase 71 may be the same as or substantially similar to those in the host/client define phase 61 in FIG. 6.

The time period from the time point t2 to the time point t7 may correspond to the data transfer phase 72. At this time, the first and second mobile devices 100b and 200b may operate in the high-speed PLC mode. The impedances Z1 and Z2 of the variable impedance units 110a and 210a respectively included in the first and second mobile devices 100b and 200b may be relatively high.

Unlike FIG. 6, in the data transfer phase 72, the converter 250 of the second mobile device 200b may be activated, and the second mobile device 200b may maintain the high voltage VH even after the time point t2. In the data transfer phase 72, the charger 150 of the first mobile device 100b may be deactivated, and the first mobile device 100b may operate using the battery voltage VBAT1 of the first battery 140a. As described above, because the charger 150 of the first mobile device 100b is deactivated, an operation of charging the first battery 140a by transmitting power from the second mobile device 200b to the first mobile device 100b may be interrupted or substantially interrupted, and only data may be transmitted through PLC.

Figure 8:
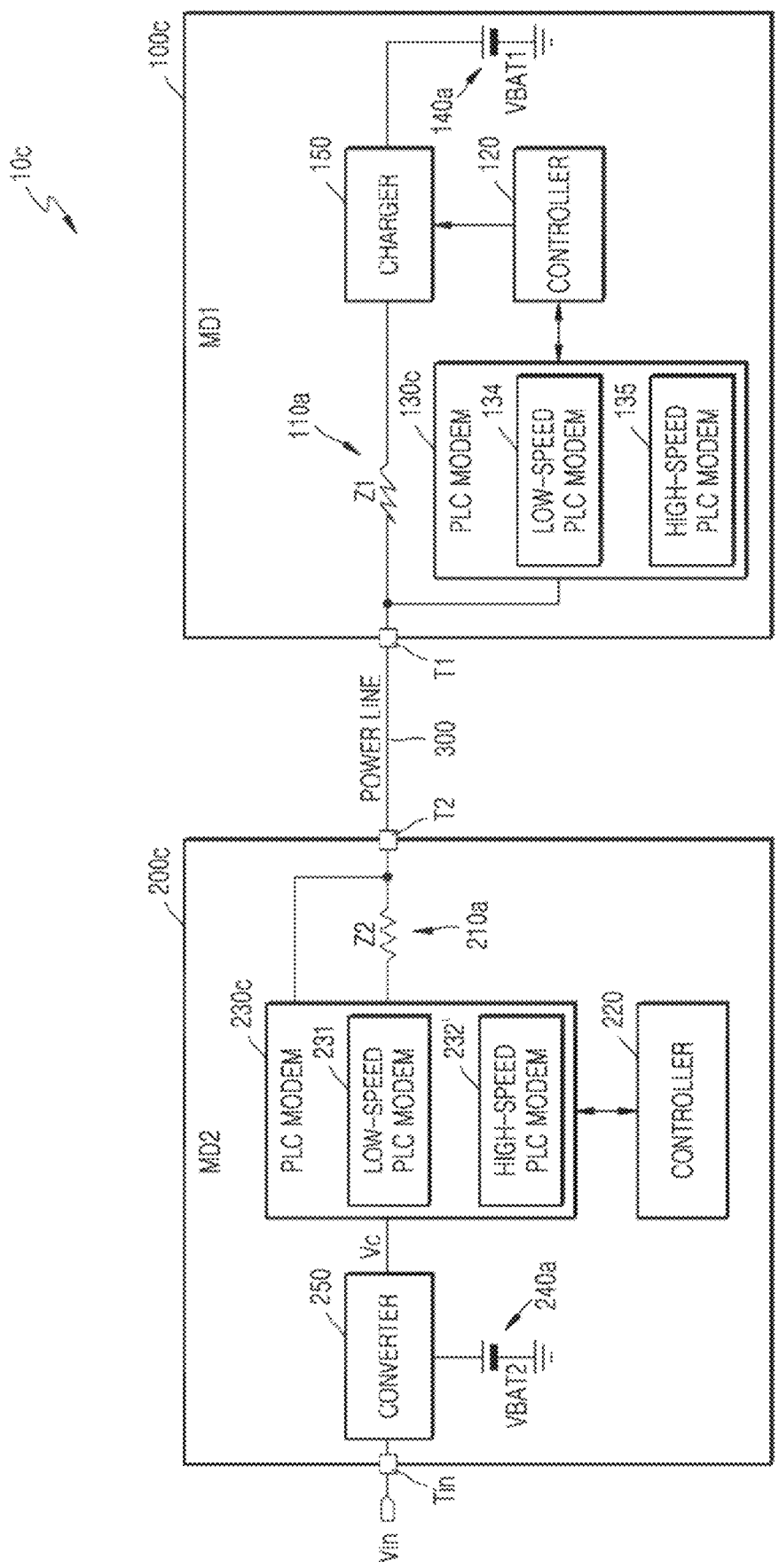
FIG. 8 illustrates a mobile system according to some example embodiments.

FIG. 8 illustrates a mobile system 10c according to some example embodiments.

Referring to FIG. 8, the mobile system 10c may include a first mobile device 100c and a second mobile device 200c. The first and second mobile devices 100c and 200c may correspond to examples of the first and second mobile devices 100 and 200 in FIG. 1.

The first mobile device 100c may include the first connection terminal T1, the variable impedance unit 110a, the controller 120, a PLC modem 130c, the first battery 140a, and/or the charger 150. The PLC modem 130c may include a low-speed PLC modem 134 and a high-speed PLC modem 135. The controller 120 may selectively activate the low-speed PLC modem 134 and the high-speed PLC modem 135 according to the PLC mode. In some example embodiments, the low-speed PLC modem 134 may include a voltage modulator and a current demodulator; and the high-speed PLC modem 135 may include a current modulator, a current source, and/or a voltage demodulator. In some example embodiments, the low-speed PLC modem 134 may include a current modulator, a current source, and/or a voltage demodulator; and the high-speed PLC modem 135 may include a voltage modulator and a current demodulator. However, some example embodiments are not limited thereto. The configurations of the low-speed PLC modem 134 and the high-speed PLC modem 135 may vary with some example embodiments.

The second mobile device 200c may include the second connection terminal T2, the variable impedance unit 210a, the controller 220, a PLC modem 230c, the second battery 240a, and/or the converter 250. The PLC modem 230c may include the low-speed PLC modem 231 and a high-speed PLC modem 232'. The controller 220 may selectively activate the low-speed PLC modem 231 and the high-speed PLC modem 232' according to the PLC mode. In some example embodiments, the low-speed PLC modem 231 may include a voltage modulator and a current demodulator; and the high-speed PLC modem 232' may include a voltage modulator and a voltage demodulator. In some example embodiments, the low-speed PLC modem 231 may include a current modulator, a current source, and/or a voltage demodulator; and the high-speed PLC modem 232' may include a voltage modulator and a voltage demodulator. However, some example embodiments are not limited thereto. The configurations of the low-speed PLC modem 231 and the high-speed PLC modem 232' may vary with some example embodiments.

Figure 9:
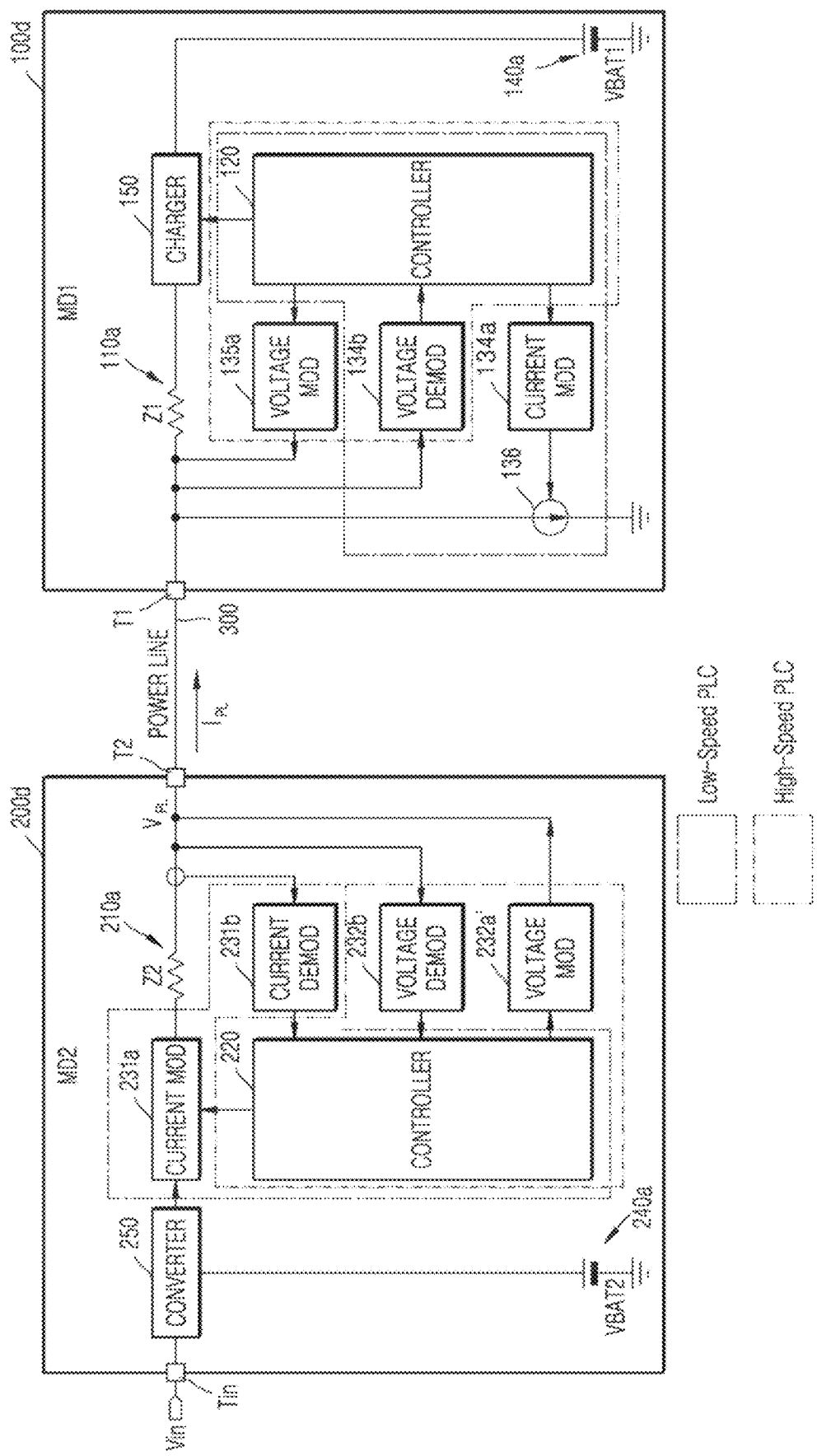
FIG. 9 illustrates a mobile system according to some example embodiments.

FIG. 9 illustrates a mobile system 10d according to some example embodiments.

Referring to FIG. 9, the mobile system 10d may include a first mobile device 100d and a second mobile device 200d. The first and second mobile devices 100d and 200d may correspond to examples of the first and second mobile devices 100c and 200c in FIG. 8. The first and second mobile devices 100d and 200d may also correspond to modifications of the first and second mobile devices 100b and 200b in FIG. 5. Hereinafter, descriptions will be focused on the differences between the first and second mobile devices 100d and 200d and the first and second mobile devices 100b and 200b in FIG. 5.

When the first mobile device 100d is connected to the second mobile device 200d by the electrical contact between the first and second connection terminals T1 and T2, the line current $I_{PL}$ may flow through the power line 300, and the respective voltages of the first and second connection terminals T1 and T2 may be the same as or similar to each other at the line voltage $V_{PL}$.

The first mobile device 100d may include the first connection terminal T1, the variable impedance unit 110a, the controller 120, a current MOD 134a, a voltage DEMOD 134b, a voltage MOD 135a, a current source 136, the first battery 140a, and/or the charger 150. According to the PLC mode, the controller 120 may generate control signals for controlling the current MOD 134a, the voltage DEMOD 134b, the voltage MOD 135a, and/or the current source 136. At this time, the current MOD 134a, the current source 136, and/or the voltage DEMOD 134b may be activated in the low-speed PLC mode and may form the low-speed PLC modem 134 in FIG. 8. The voltage MOD 135a and the voltage DEMOD 134b may be activated in the high-speed PLC mode and may form the high-speed PLC modem 135 in FIG. 8.

In the low-speed PLC mode, the controller 120 may activate the current MOD 134a, the current source 136, and the voltage DEMOD 134b and deactivate the voltage MOD 135a. In the low-speed PLC mode, the current MOD 134a may receive a control signal from the controller 120 and generate a current modulation signal according to the control signal. The current source 136 may generate a current pulse according to the current modulation signal and provide the current pulse to the first connection terminal T1. The voltage DEMOD 134b may generate a voltage demodulation signal according to the line voltage $V_{PL}$ of the first connection terminal T1 and provide the voltage demodulation signal to the controller 120.

In the high-speed PLC mode, the controller 120 may activate the voltage MOD 135a and the voltage DEMOD 134b and deactivate the current MOD 134a and the current source 136. In the high-speed PLC mode, the voltage MOD 135a may receive a control signal from the controller 120 and generate a voltage modulation signal according to the control signal. The voltage MOD 135a may transmit the voltage modulation signal to the second mobile device 200d through the first connection terminal T1. The voltage DEMOD 134b may generate a voltage demodulation signal according to the line voltage $V_{PL}$ of the first connection terminal T1 and provide the voltage demodulation signal to the controller 120.

The second mobile device 200d may include the second connection terminal T2, the variable impedance unit 210a, the controller 220, the voltage MOD 231a, the current DEMOD 231b, a voltage MOD 232a', the voltage DEMOD 232b, the second battery 240a, and/or the converter 250. As described above, while the second mobile device 200b in FIG. 5 includes the current MOD 232a and the current source 233, the second mobile device 200d may include the voltage MOD 232a'. The voltage MOD 232a' and the voltage DEMOD 232b may be activated in the high-speed PLC mode and may form the high-speed PLC modem 232' in FIG. 8.

In the low-speed PLC mode, the controller 220 may activate the voltage MOD 231a and the current DEMOD 231b and deactivate the voltage MOD 232a' and the voltage DEMOD 232b. In the low-speed PLC mode, the voltage MOD 231a may receive a control signal from the controller 220 and generate a voltage modulation signal according to the control signal. The voltage MOD 231a may transmit the voltage modulation signal to the first mobile device 100d through the variable impedance unit 210a and the second connection terminal T2. The current DEMOD 231b may generate a current demodulation signal according to the line current $I_{PL}$ received through the second connection terminal T2 and provide the current demodulation signal to the controller 220.

In the high-speed PLC mode, the controller 220 may deactivate the voltage MOD 231a and the current DEMOD 231b and activate the voltage MOD 232a' and the voltage DEMOD 232b. In the high-speed PLC mode, the voltage MOD 232a' may receive a control signal from the controller 220, generate a voltage modulation signal according to the control signal and provide the voltage modulation signal to the second connection terminal T2. The voltage DEMOD 232b may generate a voltage demodulation signal according to the line voltage $V_{PL}$ of the second connection terminal T2 and provide the voltage demodulation signal to the controller 220.

Figure 10:
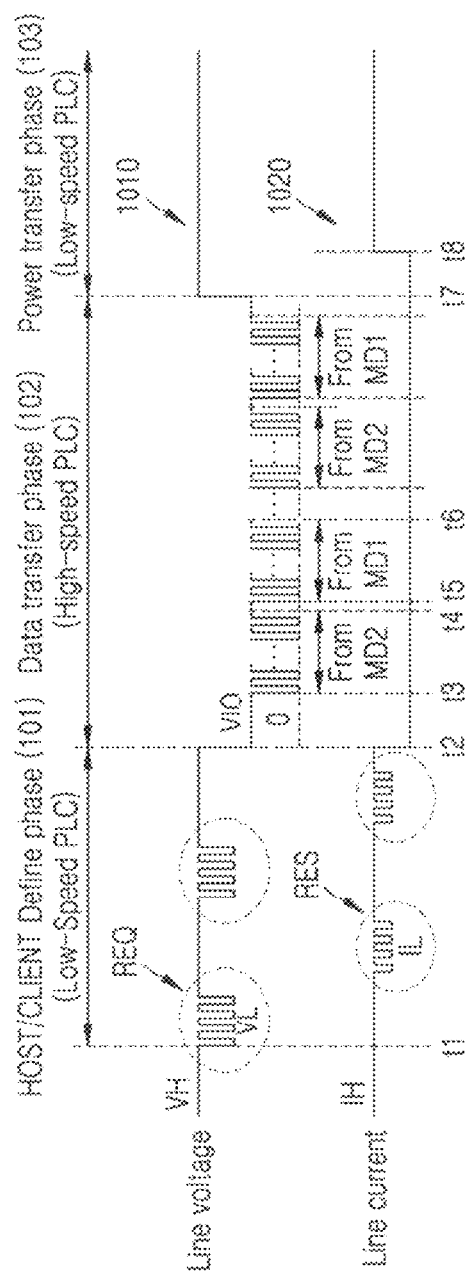
FIG. 10 is a timing diagram of an example of PLC data exchange between a first mobile device and a second mobile device, according to some example embodiments.

FIG. 10 is a timing diagram of an example of PLC data exchange between the first mobile device MD1 and the second mobile device MD2, according to some example embodiments.

Referring to FIG. 10, a first graph 1010 represents a line voltage over time and may correspond to, for example, the line voltage $V_{PL}$ of the first or second connection terminal T1 or T2 connected to the power line 300 in FIG. 9. A second graph 1020 represents a line current over time and may correspond to, for example, the line current $I_{PL}$ flowing in the power line 300 in FIG. 9. For example, the first and second mobile devices MD1 and MD2 may respectively correspond to the first and second mobile devices 100d and 200d in FIG. 9. Hereinafter, descriptions will be made with reference to FIGS. 9 and 10.

The time period from the time point t1 to the time point t2 may correspond to a host/client define phase 101. At this time, the first and second mobile devices 100d and 200d may operate in the low-speed PLC mode. The impedances Z1 and Z2 of the variable impedance units 110a and 210a respectively included in the first and second mobile devices 100d and 200d may be relatively low. In some example embodiments, the impedance Z1 of the variable impedance unit 110a may be equal or similar to the impedance Z2 of the variable impedance unit 210a in the host/client define phase 101. However, some example embodiments are not limited thereto. In some example embodiments, the impedance Z1 of the variable impedance unit 110a may be different from the impedance Z2 of the variable impedance unit 210a in the host/client define phase 101.

In the host/client define phase 101, the second mobile device 200d may transmit the host request REQ to the first mobile device 100d, and the first mobile device 100d may transmit the client response RES to the second mobile device 200d in response to the host request REQ. According to some example embodiments, the host request REQ and the client response RES may be exchanged at least two times in the host/client define phase 101.

In the host/client define phase 101, the converter 250 and the voltage MOD 231a of the second mobile device 200d may be activated, and the voltage MOD 231a may generate a voltage modulation signal from the converted voltage Vc, which is received from the converter 250, according to a control signal received from the controller 220. However, some example embodiments are not limited thereto. The converter 250 may bypass the input voltage Vin, and the voltage MOD 231a may generate the voltage modulation signal from the input voltage Vin according to the control signal received from the controller 220. For example, the voltage MOD 231a may generate a voltage modulation signal, e.g., a plurality of voltage pulses, as the host request REQ, wherein the voltage modulation signal toggles between the high voltage VH and the low voltage VL. The host request REQ may be provided to the first connection terminal T1 of the first mobile device 100d through the power line 300.

The voltage DEMOD 134b of the first mobile device 100d may generate a voltage demodulation signal from the host request REQ and provide the voltage demodulation signal to the controller 120. The controller 120 may generate a control signal in response to the host request REQ and provide the control signal to the current MOD 134a. The current MOD 134a may generate a current modulation signal according to the control signal and provide the current modulation signal to the current source 136. The current source 136 may generate, as the client response RES, a plurality of current pulses toggling between the high current IH and the low current IL according to the current modulation signal. The client response RES may be provided to the second connection terminal T2 of the second mobile device 200d through the power line 300.

After receiving the client response RES, the controller 220 of the second mobile device 200d may change the PLC mode from the low-speed PLC mode to the high-speed PLC mode and thus set the impedance Z2 of the variable impedance unit 210a to be relatively high. Similarly, after transmitting the client response RES, the controller 120 of the first mobile device 100d may change the PLC mode from the low-speed PLC mode to the high-speed PLC mode and thus set the impedance Z1 of the variable impedance unit 110a to be relatively high.

The time period from the time point t2 to the time point t7 may correspond to a data transfer phase 102. At this time, the first and second mobile devices 100d and 200d may operate in the high-speed PLC mode. The impedances Z1 and Z2 of the variable impedance units 110a and 210a respectively included in the first and second mobile devices 100d and 200d may be relatively high. In some example embodiments, the impedance Z1 of the variable impedance unit 110a may be equal or similar to the impedance Z2 of the variable impedance unit 210a in the data transfer phase 102. However, some example embodiments are not limited thereto. In some example embodiments, the impedance Z1 of the variable impedance unit 110a may be different from the impedance Z2 of the variable impedance unit 210a in the data transfer phase 102.

In the data transfer phase 102, the converter 250 of the second mobile device 200d may be deactivated, and the second mobile device 200d may operate using the battery voltage VBAT2 of the second battery 240a. For example, the converter 250 may operate in a bypass mode that bypasses the battery voltage VBAT2 of the second battery 240a. In the data transfer phase 102, the charger 150 of the first mobile device 100d may be deactivated, and the first mobile device 100d may operate using the battery voltage VBAT1 of the first battery 140a. As described above, because the charger 150 of the first mobile device 100d is deactivated, an operation of charging the first battery 140a by transmitting power from the second mobile device 200d to the first mobile device 100d may be interrupted or substantially interrupted, and only data may be transmitted through PLC. However, some example embodiments are not limited thereto. In some example embodiments, in the data transfer phase 102, the charger 150 of the first mobile device 100d may be activated, and both power and data may be transmitted through PLC.

In the time period from the time point t3 to the time point t4, the voltage MOD 232a' of the second mobile device 200d may be activated and the voltage MOD 135a of the first mobile device 100d may be deactivated. In detail, the voltage MOD 232a' of the second mobile device 200d may generate a voltage modulation signal and provide the voltage modulation signal to the power line 300 through the second connection terminal T2. For example, the voltage modulation signal may include a plurality of voltage pulses toggling between an input/output voltage VIO and 0 $V_{PL}$. At this time, the voltage DEMOD 134b of the first mobile device 100d may generate a voltage demodulation signal from the line voltage $V_{PL}$ of the first connection terminal T1 connected to the power line 300.

In the time period from the time point t5 to the time point t6, the voltage MOD 135a of the first mobile device 100d may be activated and the voltage MOD 232a' of the second mobile device 200d may be deactivated. In detail, the voltage MOD 135a of the first mobile device 100d may generate a voltage modulation signal and provide the voltage modulation signal to the power line 300 through the first connection terminal T1. For example, the voltage modulation signal may include a plurality of voltage pulses toggling between the input/output voltage VIO and 0 V. At this time, the voltage DEMOD 232b of the second mobile device 200d may generate a voltage demodulation signal from the line voltage $V_{PL}$ of the second connection terminal T2 connected to the power line 300.

The time period following the time point t7 may correspond to a power transfer phase 103. At this time, the first mobile device 100d and the second mobile device 200d may operate in the low-speed PLC mode. In the power transfer phase 103, the converter 250 and the current MOD 231a of the second mobile device 200d may be activated, and the line voltage $V_{PL}$ may maintain the high voltage VH. At the time point t8, the charger 150 of the first mobile device 100d may be activated, and the line current $I_{PL}$ may maintain the high current IH. Accordingly, the second mobile device 200d may transmit power to the first mobile device 100d through PLC, and the charger 150 of the first mobile device 100d may charge the first battery 140a.

Figure 11:
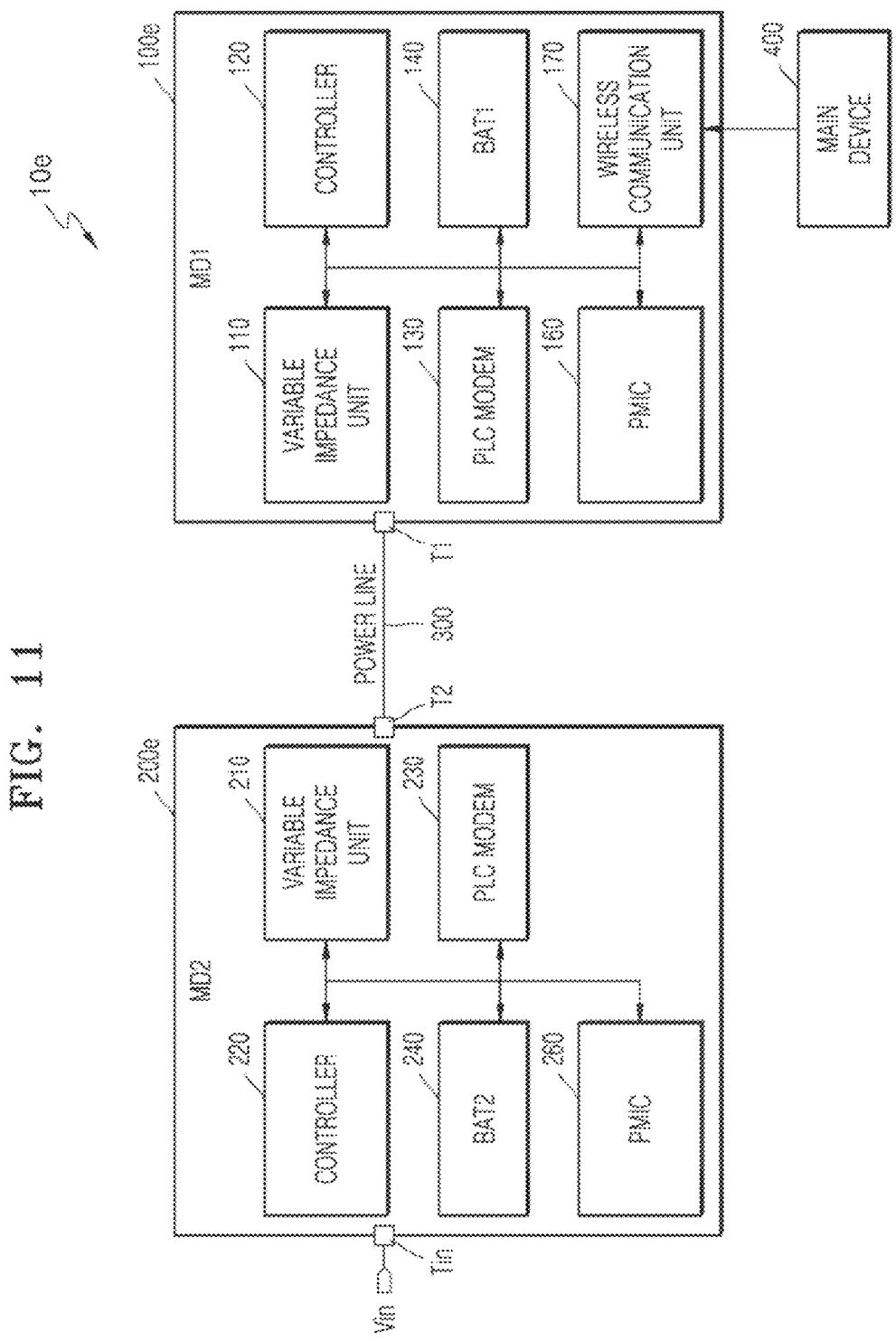
FIG. 11 illustrates a mobile system according to some example embodiments.

FIG. 11 illustrates a mobile system 10e according to some example embodiments.

Referring to FIG. 11, the mobile system 10e may include a first mobile device 100e and a second mobile device 200e. The first and second mobile devices 100e and 200e may correspond to examples of the first and second mobile devices 100 and 200 in FIG. 1. The descriptions given above with reference to FIGS. 1 through 10 may also be applied to FIG. 11.

The first mobile device 100e may include the first connection terminal T1, the variable impedance unit 110, the controller 120, the PLC modem 130, the first battery 140, a PMIC 160, and/or a wireless communication unit 170. The variable impedance unit 110, the controller 120, the PLC modem 130, the first battery 140, the PMIC 160, and/or the wireless communication unit 170 may be mounted on a PCB. The PMIC 160 may manage the power of the first battery 140. In some example embodiments, the charger 150 in FIG. 3 may be implemented as a part of the PMIC 160. In some example embodiments, the first mobile device 100e may further include a charger or a charging IC.

The wireless communication unit 170 may wirelessly communicate with a main device 400. For example, the wireless communication unit 170 may include a Bluetooth module and may receive data from the main device 400 through Bluetooth communication. For example, the main device 400 may include, but is not limited to, a smart phone, a tablet personal computer (PC), a PC, a smart television (TV), a cellular phone, a personal digital assistant (PDA), a laptop, a media player, a micro server, a global positioning system (GPS) device, an e-book terminal, a digital broadcasting terminal, a navigation device, a kiosk, an MP3 player, a digital camera, and/or other mobile or non-mobile computing devices. In another example, the main device 400 may include wearable devices, such as a watch, glasses, a hairband, and/or a ring, which have communication and data processing functions.

The second mobile device 200e may include the second connection terminal T2, the variable impedance unit 210, the controller 220, the PLC modem 230, the second battery 240, and/or a PMIC 260. The variable impedance unit 210, the controller 220, the PLC modem 230, the second battery 240, and/or the PMIC 260 may be mounted on a PCB. The PMIC 260 may manage the power of the second battery 240. In some example embodiments, the converter 250 in FIG. 3 may be implemented as a part of the PMIC 260. In some example embodiments, the second mobile device 200e may further include a converter. The second mobile device 200e may also include the input voltage terminal Tin receiving the input voltage Vin from the outside thereof.

The wireless communication unit 170 of the first mobile device 100e may receive data from the main device 400 and transmit the data to the second mobile device 200e using PLC. At this time, a host device may be the first mobile device 100e and a client device may be the second mobile device 200e. Hereinafter, the PLC mode between the first and second mobile devices 100e and 200e will be described with reference to FIGS. 2 and 11.

In the power transfer phase 21, the second mobile device 200e may transmit power to the first mobile device 100e. At this time, the PLC mode between the first and second mobile devices 100e and 200e may be determined to be the low-speed PLC mode. In the host/client define phase 22, a host transmitting data and a client receiving the data may be determined between the first and second mobile devices 100e and 200e. At this time, the PLC mode between the first and second mobile devices 100e and 200e may be still determined to be the low-speed PLC mode. For example, the first mobile device 100e may be determined to be the host and the second mobile device 200e may be determined to be the client.

In the data transfer phase 23, the host may transmit data to the client. At this time, the PLC mode between the first and second mobile devices 100e and 200e may be determined to be the high-speed PLC mode. For example, the first mobile device 100e may transmit data to the second mobile device 200e. In the data transfer phase 23, the main function of the power line 300 may be changed from power transfer to data transfer. In some example embodiments, only data may be transmitted through the power line 300 in the data transfer phase 23. However, some example embodiments are not limited thereto. Power and data may be transmitted through the power line 300 in the data transfer phase 23.

Based on completion of the data transfer, a power transfer phase 24 begins anew, and the PLC mode between the first and second mobile devices 100e and 200e may be determined to be the low-speed PLC mode. The main function of the power line 300 may be changed from data transfer to power transfer in the power transfer phase 24. In some example embodiments, only power may be transmitted through the power line 300 in the power transfer phase 24. However, some example embodiments are not limited thereto. Data and power may be transmitted through the power line 300 in the power transfer phase 24.

Figure 12:
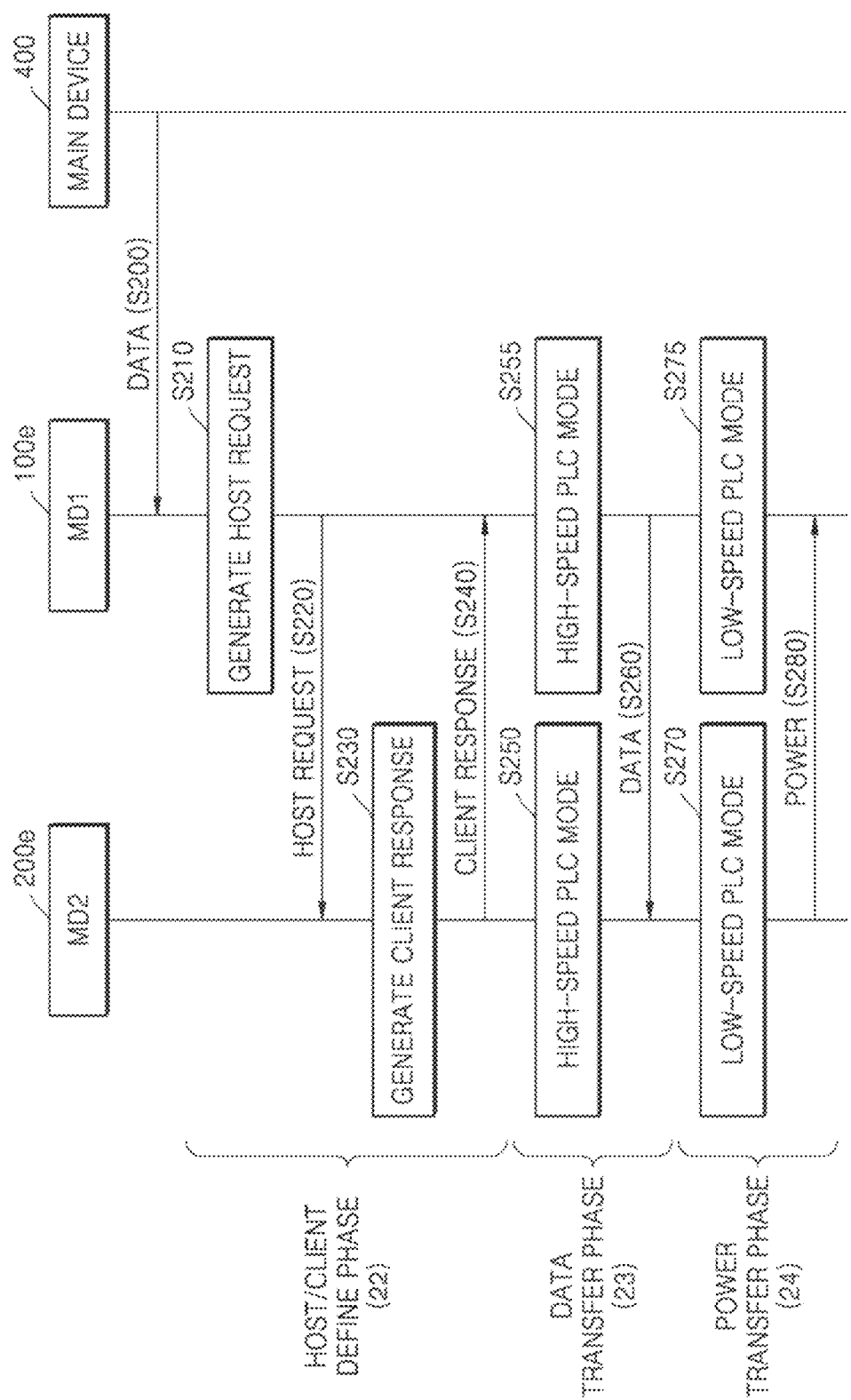
FIG. 12 is a flowchart of the operations among a first mobile device, a second mobile device, and a main device, according to some example embodiments.

FIG. 12 is a flowchart of the operations among the first mobile device 100e, the second mobile device 200e, and the main device 400, according to some example embodiments.

Referring to FIG. 12, the main device 400 may transmit data to the first mobile device 100e in operation S200. For example, the data may correspond to firmware. For example, the main device 400 may transmit the data to the first mobile device 100e through wireless communication such as Bluetooth communication. However, some example embodiments are not limited thereto. The first mobile device 100e may further include a connection terminal for data exchange with the main device 400 and may receive data from the main device 400 through electrical contact of the connection terminal to the main device 400.

The first mobile device 100e may generate a host request (e.g., REQ in FIG. 6) in operation S210. The first mobile device 100e transmits the host request to the second mobile device 200e in operation S220. The second mobile device 200e may generate a client response (e.g., RES in FIG. 6) in response to the host request in operation S230. The second mobile device 200e may transmit the client response to the first mobile device 100e in operation S240. For example, operations S210 through S240 may correspond to the host/client define phase 22 in FIG. 2, and both of the first and second mobile devices 100e and 200e may operate in the low-speed PLC mode. At this time, the impedances Z1 and Z2 of the variable impedance units 110 and 210 respectively included in the first and second mobile devices 100e and 200e may be relatively low. According to some example embodiments, the operations S210 through S240 may correspond to a detection that the first mobile device 100e has received firmware from the main device 400 (e.g., a firmware update and/or firmware configured to repair a failure in an IC of the second mobile device 200e) that should be transferred to the second mobile device 200e, and/or a request that the first mobile device 100e transfer the firmware update to the second mobile device 200e.

The second mobile device 200e may determine the PLC mode to be the high-speed PLC mode in operation S250 (e.g., based on the client response sent in operation S240). Accordingly, the impedance Z2 of the variable impedance unit 210 of the second mobile device 200e may increase, the high-speed PLC modem (e.g., 232 in FIG. 3) may be activated, and the low-speed PLC modem (e.g., 231 in FIG. 3) may be deactivated. The first mobile device 100e may determine the PLC mode to be the high-speed PLC mode in operation S255 (e.g., based on the client response). Accordingly, the impedance Z1 of the variable impedance unit 110 of the first mobile device 100e may increase. Operations S250 and S255 may be performed substantially simultaneously or contemporaneously.

The first mobile device 100e may transmit data to the second mobile device 200e in operation S260. For example, the data may correspond to firmware, and the first mobile device 100e may transmit the firmware, which is downloaded from the main device 400, to the second mobile device 200e. When a failure occurs in an IC after the second mobile device 200e is launched, the second mobile device 200e may repair the failure in the IC using the firmware received from the first mobile device 100e. For example, operations S250 through S260 may correspond to the data transfer phase 23 in FIG. 2. According to some example embodiments, the second mobile device 200e may store, install and/or execute the received firmware following operation S260. According to some example embodiments, the second mobile device 200e may repair the failure of the IC using the received firmware following operation S260.

The second mobile device 200e may determine the PLC mode to be the low-speed PLC mode in operation S270 (e.g., based on completion of the data transfer in operation S260). Accordingly, the impedance Z2 of the variable impedance unit 210 of the second mobile device 200e may decrease, the low-speed PLC modem (e.g., 231 in FIG. 3) may be activated, and the high-speed PLC modem (e.g., 232 in FIG. 3) may be deactivated. The first mobile device 100e may determine the PLC mode to be the low-speed PLC mode in operation S275 (e.g., based on completion of the data transfer in operation S260). Accordingly, the impedance Z1 of the variable impedance unit 110 of the first mobile device 100e may decrease. Operations S270 and S275 may be performed substantially simultaneously or contemporaneously. The second mobile device 200e may transmit power to the first mobile device 100e in operation S280. For example, operations S270 through S280 may correspond to the power transfer phase 24 in FIG. 2.

According to some example embodiments, operations described herein as being performed by the first mobile device 100, the second mobile device 200, the variable impedance unit 110, the controller 120, the PLC modem 130, the variable impedance unit 210, the controller 220, the PLC modem 230, the first mobile device 100a, the second mobile device 200a, the variable impedance unit 110a, the charger 150, the variable impedance unit 210a, the PLC modem 230a, the converter 250, the low-speed PLC modem 231, the high-speed PLC modem 232, the first mobile device 100b, the second mobile device 200b, the PLC modem 130a, the current MOD 131, the voltage DEMOD 132, the voltage MOD 231a, the current DEMOD 231b, the current MOD 232a, the voltage DEMOD 232b, the first mobile device 100c, the second mobile device 200c, the PLC modem 130c, the low-speed PLC modem 134, the high-speed PLC modem 135, the first mobile device 100d, the second mobile device 200d, the current MOD 134a, the voltage DEMOD 134b, the voltage MOD 135a, the voltage MOD 232a', the first mobile device 100e, the second mobile device 200e, the PMIC 160, the wireless communication unit 170 and/or the PMIC 260 may be performed by processing circuitry. The term 'processing circuitry,' as used in the present disclosure, may refer to, for example, hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a Systemon-Chip (SoC), a programmable logic unit, a microprocessor, application-specific integrated circuit (ASIC), etc.

It will be understood that when an element is referred to as being "connected" or "coupled" to another element, it can be directly connected or coupled to the other element or intervening elements may be present. As used herein the term "and/or" includes any and all combinations of one or more of the associated listed items.

Some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed concurrently, simultaneously, or in some cases be performed in reverse order.

The various operations of methods described above may be performed by any suitable device capable of performing the operations, such as processing circuitry. For example, the operations of methods described above may be performed by various hardware and/or software implemented in some form of hardware (e.g., processor, ASIC, etc.).

The software may comprise an ordered listing of executable instructions for implementing logical functions, and may be embodied in any "processor-readable medium" for use by or in connection with an instruction execution system, apparatus, or device, such as a single or multiple-core processor or processor-containing system.

The blocks or operations of a method or algorithm and functions described in connection with some example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to some example embodiments thereof, it will be understood that various changes in form and details may be made therein without departing from the spirit and scope of the following claims.

What is claimed is:

1. A first mobile device comprising:
a connection terminal configured to electrically connect to a second mobile device; and
a power line communication (PLC) modem configured to receive power from the second mobile device or communicate data with the second mobile device based on a PLC mode between the first mobile device and the second mobile device,
wherein
the PLC mode is changeable between a high-speed PLC mode and a low-speed PLC mode in response to a host request received from the second mobile device,
the PLC modem is further configured to communicate the data with the second mobile device in the high-speed PLC mode, and
the PLC modem is further configured to receive the power from the second mobile device in the low-speed PLC mode, or receive the power from the second mobile device and communicate the data with the second mobile device in the low-speed PLC mode, and
wherein
the PLC mode is changed from the low-speed PLC mode to the high-speed PLC mode in response to sending a client response with respect to the host request to the second mobile device, and
the PLC mode is changed from the high-speed PLC mode to the low-speed PLC mode based on completion of a data reception from the second mobile device.

2. The first mobile device of claim 1, further comprising:
a variable impedance device connected to the connection terminal, the variable impedance device configured to vary an impedance,
wherein the impedance of the variable impedance device corresponds to a first impedance in the low-speed PLC mode.

3. The first mobile device of claim 2, wherein the impedance of the variable impedance device corresponds to a second impedance in the high-speed PLC mode, the second impedance being higher than the first impedance.

4. The first mobile device of claim 2, further comprising:
processing circuitry configured to
change the PLC mode between the low-speed PLC mode and the high-speed PLC mode in response to receiving the host request from the second mobile device, and
control the impedance of the variable impedance device according to the PLC mode.

5. The first mobile device of claim 4, wherein the processing circuitry is further configured to generate a control signal for controlling the PLC modem according to the PLC mode; and
the PLC modem is further configured to
generate a current modulation signal according to the control signal,
generate a current pulse according to the current modulation signal,
provide the current pulse to the connection terminal, and
generate a voltage demodulation signal according to a voltage of the connection terminal.

6. The first mobile device of claim 4, wherein the processing circuitry is further configured to generate a control signal for controlling the PLC modem according to the PLC mode; and
the PLC modem is further configured to operate in the high-speed PLC mode including
generating a voltage modulation signal according to the control signal,
providing the voltage modulation signal to the connection terminal, and
generating a voltage demodulation signal according to a voltage of the connection terminal.

7. The first mobile device of claim 4, wherein the processing circuitry is further configured to generate a control signal for controlling the PLC modem according to the PLC mode; and the PLC modem is further configured to operate in the low-speed PLC mode including
generating a current modulation signal according to the control signal,
generating a current pulse according to the current modulation signal,
providing the current pulse to the connection terminal, and
generating a voltage demodulation signal according to a voltage of the connection terminal.

8. The first mobile device of claim 4, further comprising:
a battery; and
a power management integrated circuit (PMIC) configured to manage power of the battery,
wherein the processing circuitry is further configured to charge the battery with the power received from the second mobile device.

9. The first mobile device of claim 1, wherein
the first mobile device includes a wireless earbud; and
the second mobile device includes a wireless charger.

10. The first mobile device of claim 1, wherein the host request includes a voltage pulse toggling between a high voltage and a low voltage, and the client response includes a current pulse toggling between a high current and a low current.

11. A second mobile device comprising:
a connection terminal configured to electrically connect to a first mobile device; and
a power line communication (PLC) modem configured to transmit power to the first mobile device or communicate data with the first mobile device based on a PLC mode between the first mobile device and the second mobile device,
wherein
the PLC mode is changeable between a high-speed PLC mode and a low-speed PLC mode in response to a client response received from the first mobile device,
the PLC modem is further configured to communicate the data with the first mobile device in the high-speed PLC mode, and
the PLC modem is further configured to transmit the power to the first mobile device in the low-speed PLC mode, or transmit the power to the first mobile device and communicate the data with the first mobile device in the low-speed PLC mode, and
wherein
the PLC mode is changed from the low-speed PLC mode to the high-speed PLC mode in response to receiving the client response from the first mobile device, and
the PLC mode is changed from the high-speed PLC mode to the low-speed PLC mode based on completion of a data reception from the first mobile device.

12. The second mobile device of claim 11, further comprising:
a variable impedance device connected to the connection terminal, the variable impedance device configured to vary an impedance,
wherein the impedance of the variable impedance device corresponds to a first impedance in the low-speed PLC mode.

13. The second mobile device of claim 12, wherein the impedance of the variable impedance device corresponds to a second impedance in the high-speed PLC mode, the second impedance being higher than the first impedance.

14. The second mobile device of claim 12, further comprising:
processing circuitry configured to
change the PLC mode from the low-speed PLC mode to the high-speed PLC mode in response to receiving the client response from the first mobile device,
control the impedance of the variable impedance device according to the PLC mode,
receive an input voltage from an external source, and generate a converted voltage from the input voltage,
wherein the power is based on the converted voltage.

15. The second mobile device of claim 14, wherein the processing circuitry is further configured to generate a control signal for controlling the PLC modem according to the PLC mode; and
the PLC modem is further configured to operate in the high-speed PLC mode including
generating a current modulation signal according to the control signal,
generating a current pulse according to the current modulation signal,
providing the current pulse to the connection terminal, and
generating a voltage demodulation signal according to a voltage of the connection terminal.

16. The second mobile device of claim 14, wherein the processing circuitry is further configured to generate a control signal for controlling the PLC modem according to the PLC mode; and
the PLC modem is further configured to operate in the high-speed PLC mode including
generating a voltage modulation signal according to the control signal,
providing the voltage modulation signal to the connection terminal, and
generating a voltage demodulation signal according to a voltage of the connection terminal.

17. The second mobile device of claim 14, wherein the processing circuitry is further configured to generate a control signal for controlling the PLC modem according to the PLC mode; and
the PLC modem is further configured to operate in the low-speed PLC mode including
generating a voltage modulation signal according to the control signal,
providing the voltage modulation signal to the connection terminal, and
generating a current demodulation signal according to a current received from the connection terminal.

18. The second mobile device of claim 14, further comprising:
a battery; and
a power management integrated circuit (PMIC) configured to manage power of the battery,
wherein the processing circuitry is further configured to charge the battery based on the input voltage.

19. The second mobile device of claim 11, wherein
the first mobile device includes a wireless earbud; and
the second mobile device includes a wireless charger.

20. The second mobile device of claim 11, wherein the second mobile device is configured to transmit a host request to the first mobile device, and receive the client response with respect to the host request from the first mobile device, and
wherein the host request includes a voltage pulse toggling between a high voltage and a low voltage, and the client response includes a current pulse toggling between a high current and a low current.

* * * * *